United States Patent
Suzuki (10) Patent No.: US 7,026,796 B2
(45) Date of Patent: Apr. 11, 2006

(54) BOOSTER CIRCUIT AND METHOD FOR CONTROLLING THE SAME

(75) Inventor: Hiroshi Suzuki, Okazaki (JP)

(73) Assignee: Toyoda Koki Kabushiki Kaisha, Aichi-Ken (JP)

(*) Notice: Subject to any disclaimer, the term of this patent is extended or adjusted under 35 U.S.C. 154(b) by 0 days.

(21) Appl. No.: 10/788,816

(22) Filed: Feb. 27, 2004

(65) Prior Publication Data
US 2004/0207370 A1    Oct. 21, 2004

(30) Foreign Application Priority Data
Apr. 17, 2003   (JP) ............... 2003-112981

(51) Int. Cl.
*G05F 1/613* (2006.01)
(52) U.S. Cl. ............... 323/224; 323/282
(58) Field of Classification Search ........... 323/224, 323/282, 284
See application file for complete search history.

(56) References Cited

U.S. PATENT DOCUMENTS

| 4,536,700 A | 8/1985 | Bello et al. |
| 4,801,859 A * | 1/1989 | Dishner ............ 323/224 |
| 4,835,454 A | 5/1989 | White |
| 5,359,280 A * | 10/1994 | Canter et al. ............ 323/282 |
| 5,689,176 A | 11/1997 | Deloy |
| 6,194,880 B1 * | 2/2001 | Fraidlin et al. ............ 323/222 |

OTHER PUBLICATIONS

Patent Abstracts of Japan, vol. 2003, No. 07, Jul. 3, 2003 & JP 2003 089360 A (Toyoda Mach Works Ltd), Mar. 25, 2003, Abstract.

Naim R et al., "H<>sp1 infin// control of boost converters: comparison to voltage mode, feedforward and current mode controls"; *Power Elecronics Specialists Conference*, 1995 PESC '95 Record., 26th Annual IEEE, Atlanta, GA, USA Jun. 18-22, 1995, New York, NY, USA, IEEE, US, Jun. 18, 1995; pp. 1327-1332, XP010150721 ISBN: 0-7803-2730-6.

* cited by examiner

*Primary Examiner*—Shawn Riley
(74) *Attorney, Agent, or Firm*—Darby & Darby (57) ABSTRACT

A booster circuit is equipped with booster control section that detects a power supply voltage and an actual booster voltage. The booster control section sets a target booster voltage. The booster control section 200 sets a duty ratio to eliminate a deviation between the target booster voltage and the actual booster voltage. The booster control section calculates a correction value based on an input voltage change obtained from the power supply voltage. The booster control section provides feedback control by correcting a duty ratio using the correction value, and turning on and off a transistor based on the corrected duty ratio.

14 Claims, 6 Drawing Sheets

BOOSTER CIRCUIT AND METHOD FOR CONTROLLING THE SAME

INCORPORATION BY REFERENCE

The present application claims priority under 35 U.S.C. §119 to Japanese Patent Application No. 2003-112981 filed on Apr. 17, 2003. The content of the application is incorporated herein by reference in its entirety.

BACKGROUND OF THE INVENTION

The present invention relates to a booster circuit and a method for controlling the same.

Figure 5:
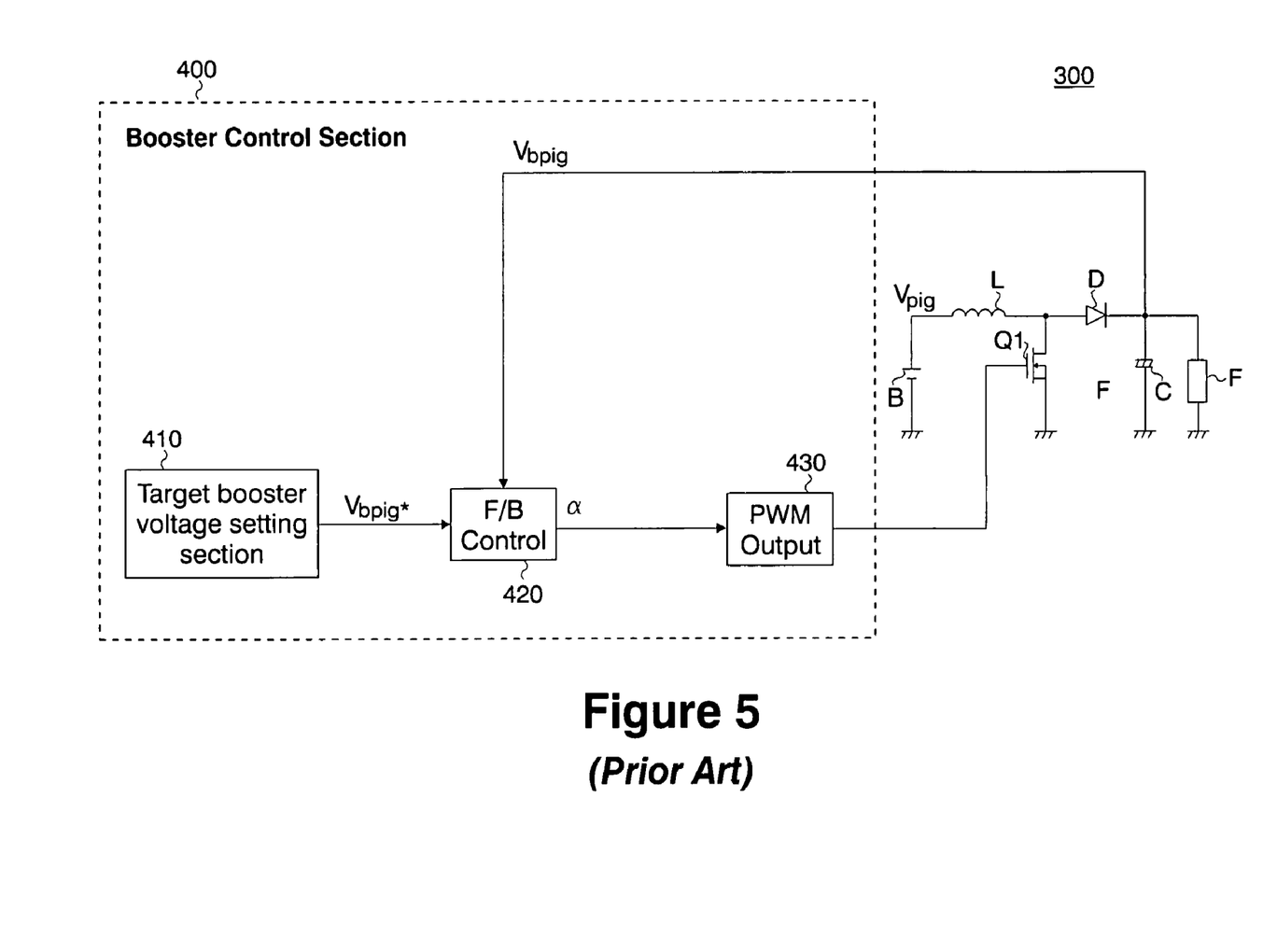
FIG. 5 is an electrical circuit diagram of a prior art booster circuit.

FIG. 5 shows a conventional booster circuit such as in Japanese Patent Publication Hei 06-311733. A booster circuit 300 is equipped with a series circuit formed from an inductor L and a diode D placed between a battery B and an electrical load F. A transistor Q1 (e.g., a MOS-FET) is placed between the inductor L and the diode D to allow exciting current to flow or stop. Also, the cathode end of the diode D is grounded by way of a capacitor C. Also, the booster circuit 300 is equipped with a booster control module 400 for turning the transistor Q1 on and off.

The booster control module 400 is formed from an ECU (electronic control unit) equipped with a ROM, a RAM, a CPU (central processing unit), and the like (not shown in the figure). In FIG. 5, the blocks in the booster control module 400 indicate control blocks representing functions executed by the CPU. The different modules shown in FIG. 5 represent functions executed by the control program and do not represent independent hardware units.

The booster control module 400 includes a target booster voltage setting module 410, a feedback control module 420, and a PWM output module 430. The target booster voltage setting module 410 reads a target booster voltage $V_{bpig*}$ stored ahead of time in the ROM mentioned above and sends the target booster voltage $V_{bpig*}$ to a feedback control module 420.

The feedback control module 420 calculates the deviation between the target booster voltage $V_{bpig*}$ and an actual booster voltage $V_{bpig}$ received by way of an A/D converter not shown in the figure. In order to reduce this deviation, i.e., to provide feedback control, proportional (P), integration (I), and deviation (D) operations are performed to calculate control values for the transistor Q1. Furthermore, the feedback control module 420 calculates a duty ratio (on-duty) α corresponding to the calculated control value and sends this to a PWM output module 430.

At the PWM output module 430, conversion to a duty ratio drive signal (PWM drive signal) is based on the duty ratio (on-duty) α. The converted duty ratio drive signal is applied to the transistor Q1 of the booster circuit 300. This duty ratio drive signal provides duty control for the transistor Q1.

Figure 6:
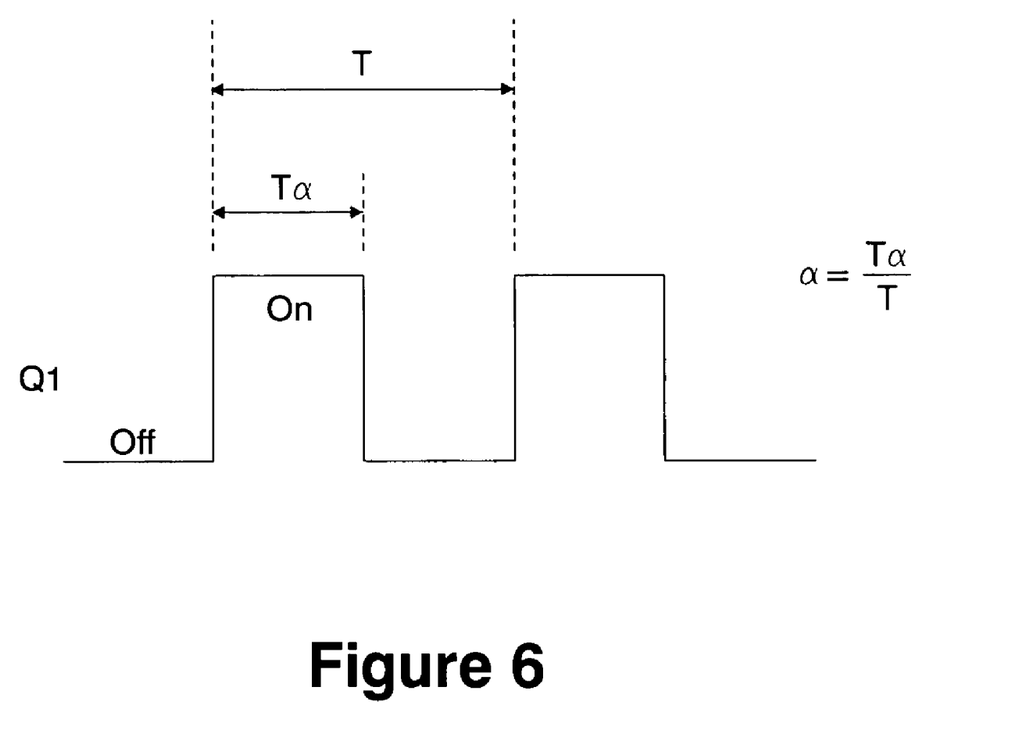
FIG. 6 is a waveform diagram of a PWM drive signal for the transistor Q1 depicted in FIG. 5.

More specifically, as a result of this duty control, the transistor Q1 performs switching as shown in FIG. 6, leading to the repeated build-up and discharge of energy in the inductor L. This causes a high voltage to appear on the cathode side of the diode D during discharges. As FIG. 6 shows, Tα represents on time, T is the pulse period, and α is the duty ratio (on-duty).

Current flows through the inductor L when the transistor Q1 is turned on and current flow through the inductor L is cut off when the transistor Q1 is turned off. When the current through the inductor L is cut off, a high voltage is generated on the cathode side of the diode D to prevent the magnetic flux from changing due to the current stopping. By repeating this process, the cathode side of the diode D is made to repeatedly generate a high voltage, which the capacitor C smoothes (charges), resulting in a boosted capacitor voltage (hereinafter referred to as actual booster voltage $V_{bpig}$).

The booster circuit 300 associates the boosted voltage with the duty ratio of a duty ratio drive signal output from the booster control section 400. If the duty ratio is high, the actual booster voltage $V_{bpig}$ increases. If the duty ratio is low, the actual booster voltage $V_{bpig}$ decreases.

The present applicant has proposed, such as in Japanese Patent Publication 2003-89360, a booster circuit which, instead of the diode D described above, is equipped with transistor (MOS-FET) with a drain connected to an electrical load F and a source connected to the inductor L. In this arrangement, two transistors are turned on and off in an alternating manner, providing synchronous rectification control. For feedback control, a control method similar to the conventional example shown in FIG. 5 is used.

Conventional feedback control works with no problems if a power supply voltage (input voltage) $V_{pig}$ is stable. However, during the initial period where there is no feedback, if the power supply voltage $V_{pig}$ changes, the actual booster voltage $V_{bpig}$ increases when the power supply voltage $V_{pig}$ increases because the duty ratio (on duty) α does not change. Conversely, when the power supply voltage $V_{pig}$ decreases, the actual booster voltage $V_{bpig}$ also decreases. Then, with feedback control, the deviation between a target booster voltage $V_{bpig*}$ and the changed actual booster voltage $V_{bpig}$ also changes. By varying the duty ratio (on duty) calculated to eliminate this deviation, the voltage is made to converge to the target booster voltage.

However, there is a limit to the degree of responsiveness possible with feedback control. Thus, it is not possible to track sudden changes in the power supply voltage $V_{pig}$, which can make the actual booster voltage $V_{bpig}$ unstable.

OBJECT AND SUMMARY OF THE INVENTION

The object of the present invention is to provide a booster circuit and control method for the same that overcomes the problems described above and prevents changes in the actual booster voltage associated with sudden changes in a power supply voltage (input voltage).

In order to overcome the problems described above, the invention provides a booster circuit wherein energy is stored in an inductor when a switching element is on and the energy is superposed onto an input voltage to charge a capacitor disposed at an output side when the switching element is off. The booster circuit includes detecting means detecting the input voltage and an actual booster voltage on the capacitor side, target booster setting means setting a target booster voltage, duty ratio setting means setting a duty ratio so that deviation between the target booster voltage and the actual booster voltage is eliminated, and controlling means calculating a correction value based on an input voltage change obtained from the input voltage, correcting the duty ratio with the correction value, and performing feedback control based on the new duty ratio by turning the switching element on and off.

The correction value is a ratio between an input voltage change calculated from the input voltage and the target booster voltage.

Also, the correction value can be a ratio between an input voltage change calculated from the input voltage and the actual booster voltage.

The invention provides a method for controlling a booster circuit wherein energy is stored in an inductor when a switching element is on and the energy is superposed onto an input voltage to charge a capacitor disposed at an output side when the switching element is off. The method for controlling a booster circuit includes a step for detecting the input voltage and an actual booster voltage on the capacitor side, a step for setting a duty ratio to eliminate a deviation between the target booster voltage and the actual booster voltage, a step for calculating a correction value based on an input voltage change obtained from the input voltage, and a step for performing feedback control by turning on and off the switching element based on a new duty ratio formed by correcting the duty ratio with the correction value.

Again, the correction value is a ratio between the input voltage change calculated based on the input voltage and the target booster voltage, or the correction value is a ratio between the input voltage change calculated based on the input voltage and the actual booster voltage.

The above, and other objects, features and advantages of the present invention will become apparent from the following description read in conjunction with the accompanying drawings, in which like reference numerals designate the same elements.

List of Designators:
100: booster circuit
200: booster control section (detecting means, target voltage setting means, duty ratio setting means, controlling means)
$V_{pig}$: power supply voltage (input voltage)
$\Delta V_{pig}$: input voltage change
$V_{bpig}$: actual booster voltage
$V_{bpig*}$: target booster voltage
$\alpha$: duty ratio (on duty)
$\beta$: correction value
B: battery
L: inductor
C: capacitor
Q1: transistor (switching element)

DETAILED DESCRIPTION OF THE PREFERRED EMBODIMENTS

Figure 1:
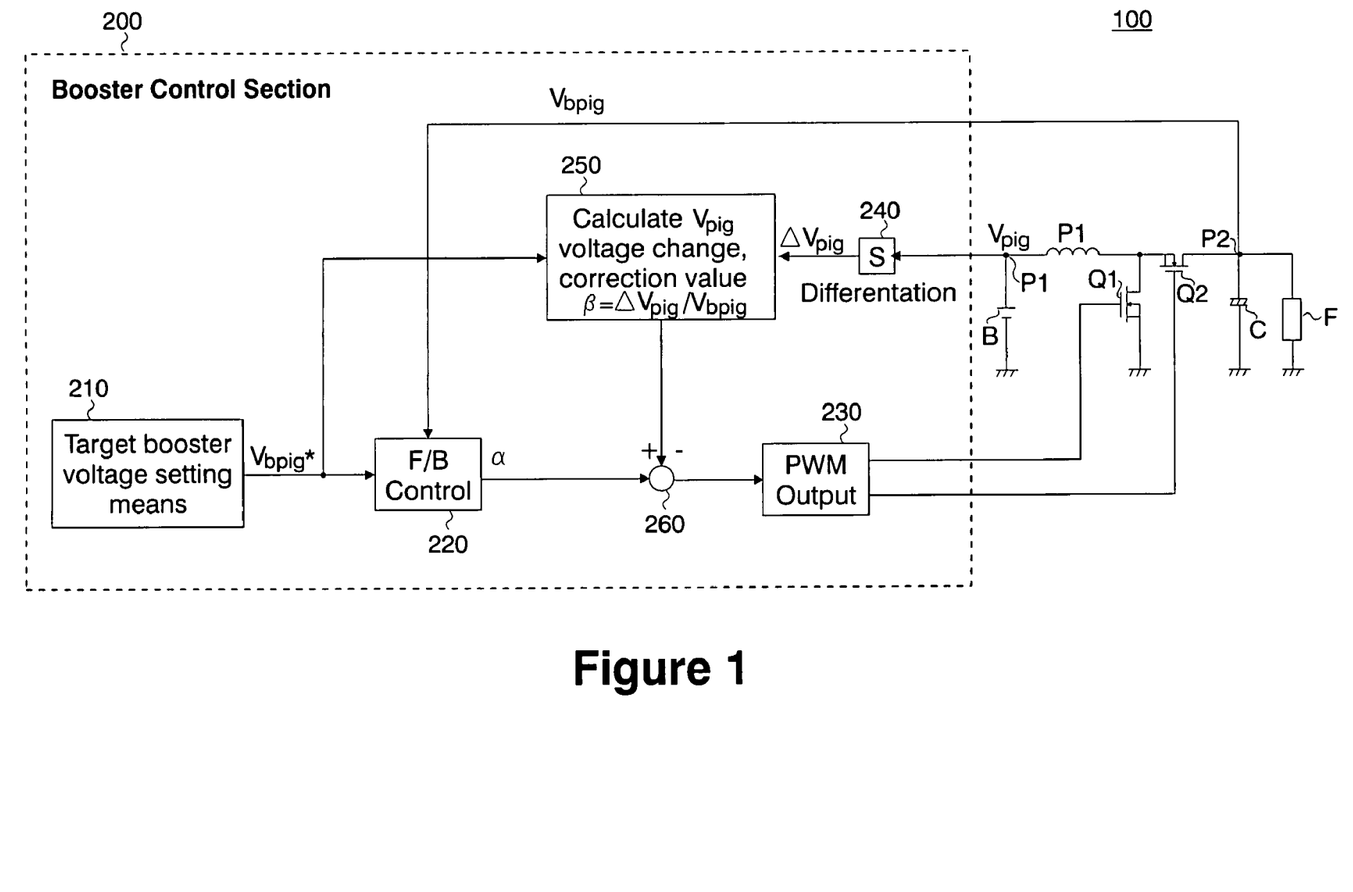
FIG. 1 is an electrical circuit diagram of a booster circuit implementing a first embodiment of the present invention.
Figure 2:
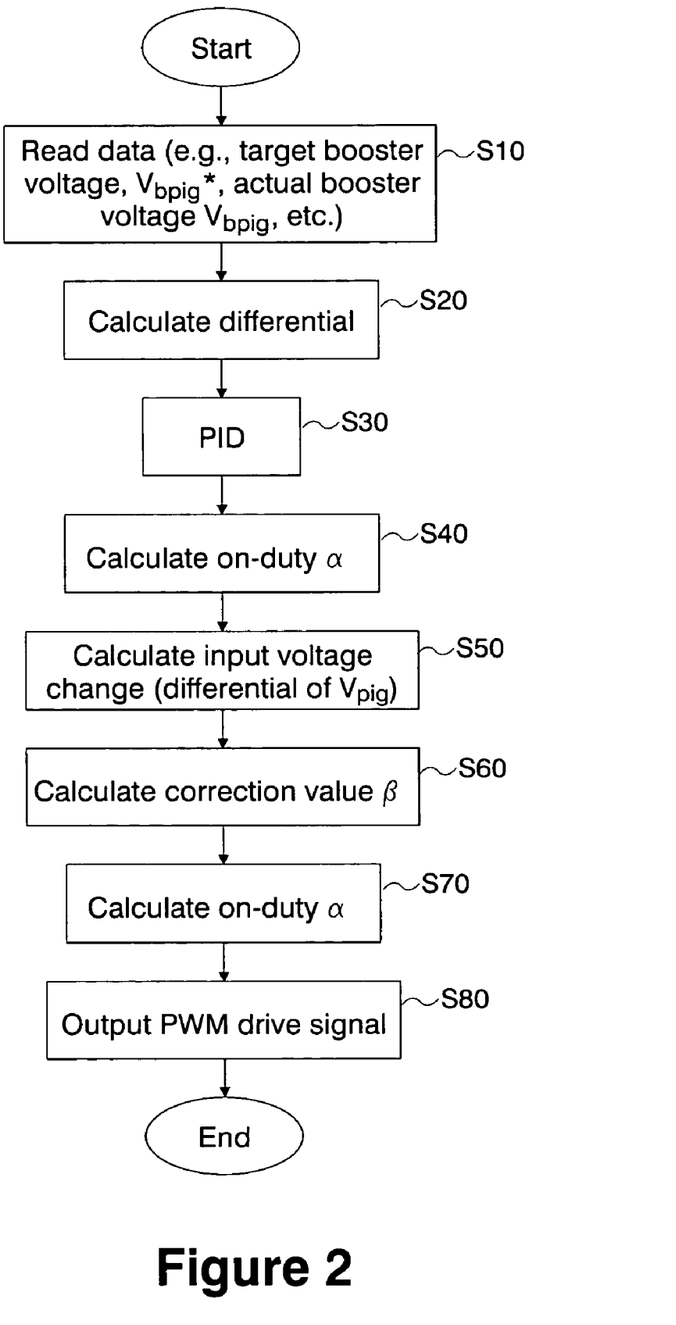
FIG. 2 is a flowchart of a booster control program.
Figure 3:
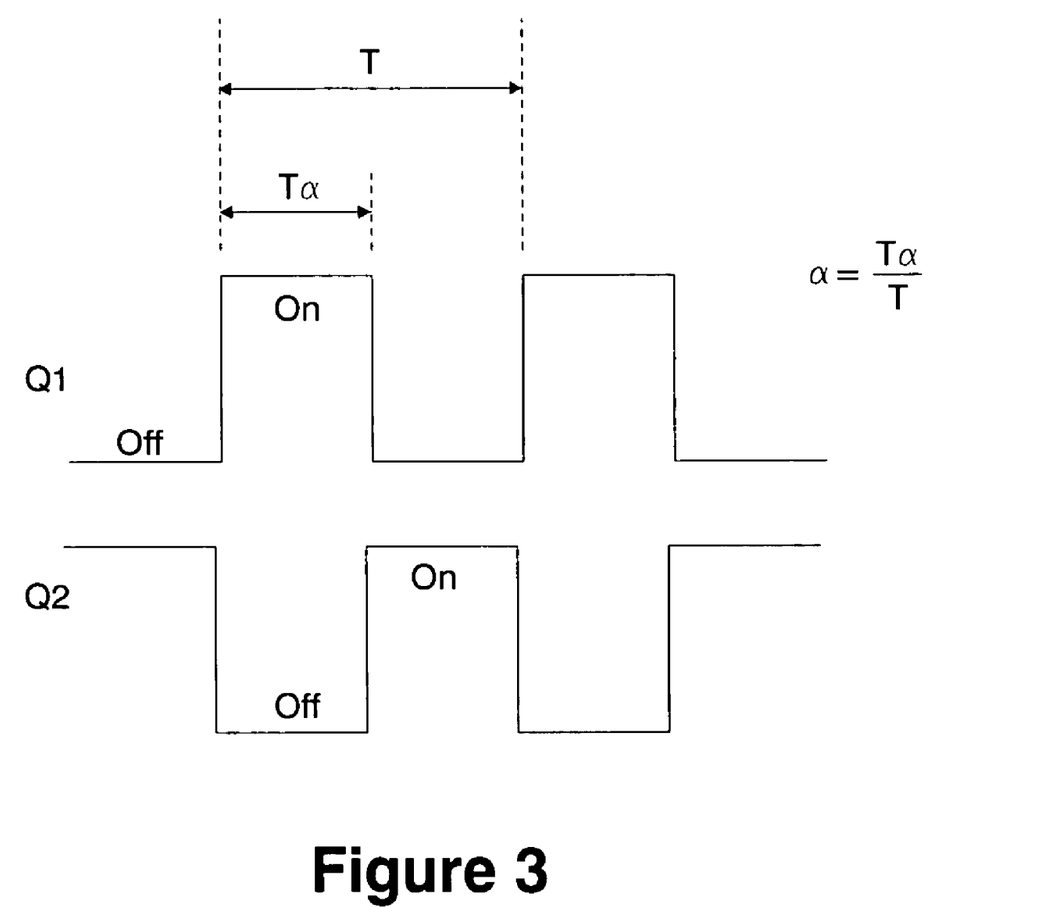
FIG. 3 is a waveform diagram of a duty ratio drive signal.

An embodiment of a booster circuit that implements the present invention will be described with references to FIG. 1 through FIG. 3. FIG. 1 is an electronic circuit diagram of a booster circuit 100. FIG. 2 is a flowchart of a control program. FIG. 3 is a waveform diagram of a duty ratio drive signal.

In this embodiment, the booster circuit 100 boosts the power supply voltage (input voltage), which is a battery voltage. Elements identical with those from the conventional technology described above will be assigned the same numerals and detailed descriptions thereof will be omitted.

In this embodiment, a transistor Q2 is used in place of the diode D from the conventional technology. The source of the transistor Q2 is connected to the output terminal of the inductor L and the drain is connected to an electrical load F. Also, the gate of the transistor Q2 is connected to a booster control section 200. A capacitor C is connected to the drain, which serves as the output terminal of the transistor Q2. The drain of a transistor Q1 is connected to the connection point between the output terminal of the inductor L and the transistor Q2 and the source is connected to ground. The gate of the transistor Q1 is connected to the booster control section 200.

In order to allow voltage detection at a voltage application point P1, which is the connection point between a battery B and the inductor L, the voltage application point P1 is connected to an A/D converter (not shown) and a voltage input port of a CPU (not shown) of the booster control section 200. This allows the power supply voltage (input voltage) $V_{pig}$ to be detectable as an actual measurement value. Also, in order to allow voltage detection at a voltage application point P2, which is the connection point between the capacitor C and the electrical load F, the voltage application point P2 is connected to an A/D converter (not shown) and the voltage input port of the CPU (not shown) of the booster control section 200. This allows the actual booster voltage $V_{bpig}$ to be detectable as an actual measurement value.

The transistor Q1 and the transistor Q2 are n-channel MOSFETs. The transistor Q1 corresponds to the switching element in the present invention. Next, the booster control section 200, which controls the two transistors, will be described.

The booster control section 200 is formed from an ECU (electronic control unit) equipped with a ROM, a RAM, a CPU (central processing unit), and the like not shown in the figure. In FIG. 1, the blocks inside the booster control section 200 indicate control blocks representing functions executed by the CPU through a booster control program stored in the ROM. The different sections shown in the figure represent functions executed by the control program rather than independent hardware units.

The booster control section 200 is equipped with a target booster voltage setting section 210, a feedback control section 220, a PWM output section 230, a differentiator 240, a correction calculating section 250, and an adder 260. The target booster voltage setting section 210 reads the target booster voltage $V_{bpig*}$ stored ahead of time in the ROM and sends the target booster voltage $V_{bpig*}$ to the feedback control section 220.

The feedback control section 220 calculates the deviation between the target booster voltage $V_{bpig*}$ and the actual booster voltage $V_{bpig}$ input by way of the A/D converter and the voltage input port (not shown in the figure). In order to reduce this deviation, i.e., to perform feedback control, the feedback control section 220 performs proportion (P), integration (I), and differentiation (D) operations to calculate a control value for the transistor Q1. Then, the feedback control section 220 calculates a duty ratio (on duty) $\alpha$ corresponding to the calculated control value. This is output to the adder 260.

The differentiator 240 takes a time deviation of the power supply voltage (input voltage) $V_{pig}$ from the voltage application point P1 received via the A/D control section and the voltage input port. This results in an input voltage change $\Delta V_{pig}$. A correction calculation section 250 calculates a correction amount (correction value) associated with the input voltage change $\Delta V_{pig}$. In this embodiment, a correction value $\beta$ is calculated as the ratio between the input voltage change $\Delta V_{pig}$ and the target booster voltage $V_{bpig*}$ ($\beta = \Delta V_{pig}/V_{bpig*}$). Regarding input voltage change $\Delta V_{pig}$ obtained by taking a time differential, $\Delta V_{pig} > 0$ if the power supply voltage rises (increases), and $\Delta V_{pig} < 0$ if the power supply voltage $V_{pig}$ drops (decreases). Thus, the correction value $\beta$ will also take positive or negative values based on increases and decreases in the power supply voltage $V_{pig}$.

The adder 260 calculates a new duty ratio $\alpha$ by subtracting the ratio of the input voltage change $\Delta V_{pig}$ to the target booster voltage $V_{bpig*}$ ($\beta = \Delta V_{pig}/V_{bpig*}$) from the duty ratio (on duty) $\alpha$. This new duty ratio $\alpha$ is sent to the PWM output section 230.

In the PWM output section 230, the new duty ratio (on duty) $\alpha$ is converted to a duty ratio drive signal (PWM drive signal) for the transistor Q1, and this converted duty ratio drive signal is applied to the transistor Q1 of the booster circuit 100. This duty ratio drive signal provides duty control for the transistor Q1.

Also in the PWM output section 230, a duty ratio $(1-|\alpha|)$ for the transistor Q2 is determined based on the new duty ratio (on duty) $\alpha$, and this duty ratio is converted to a duty ratio drive signal (PWM drive signal). This converted duty ratio drive signal is applied to the transistor Q2 of the booster circuit 100. This duty ratio drive signal provides duty control for the transistor Q2. In this manner, the transistor Q1 and the transistor Q2 are controlled using a synchronous rectifier system (see FIG. 3) where on-off control is applied alternately between the transistor Q1 and the transistor Q2.

FIG. 3 shows a pulse signal (duty ratio drive signal) applied to the transistors Q1, Q2, where $T\alpha$ is on time, T is pulse interval, and $\alpha$ is the duty ratio (on duty) associated with the transistor Q1. The transistor Q2 receives a pulse signal (duty ratio drive signal) that is off when the transistor Q1 is on and on when the transistor Q1 is off.

With this duty control, a current flows through the inductor L when the transistor Q1 is on and the current to the inductor L is stopped when the transistor Q1 is off. When the current flowing through the inductor L is stopped, a high voltage is generated at the drain side of the transistor Q1 to prevent a change in the magnetic flux caused by the stopping of the current. This is repeated so that a high voltage is repeatedly generated on the drain side of the transistor Q1. This is then smoothed (charged) by the capacitor C, resulting in a boosted actual booster voltage $V_{bpig}$.

During this process, the booster circuit 100 associates the boosted voltage with the duty ratio of the duty ratio drive signal output from the booster control section 200. If the duty ratio is high, the actual booster voltage $V_{bpig}$ is high, and if the duty ratio is low, the actual booster voltage $V_{bpig}$ is low.

When there is a change in the power supply voltage $V_{pig}$, the duty ratio $\alpha$ of the transistor Q1 obtained by the feedback control section 220 is corrected using the ratio between the input voltage change $\Delta V_{pig}$ and the target booster voltage $V_{bpig*}$ ($\beta = \Delta V_{pig}/V_{bpig*}$), resulting in a new duty ratio $\alpha$. In other words, feed-forward control is performed.

For example, if the power supply voltage $V_{pig}$ increases, the correction value $\beta$ ($>0$) is subtracted from the duty ratio (on duty) of the transistor Q1 obtained by the feedback control section 220. The new duty ratio $\alpha$ for the transistor Q1 will prevent an increase in the on duty resulting from the power supply voltage $V_{pig}$.

If the power supply voltage $V_{pig}$ decreases, the correction value $\beta$ ($<0$) is subtracted (more accurately, added, since the correction value is negative in this case) from the duty ratio (on duty) $\alpha$ of the transistor Q1 obtained by the feedback control section 220. The new duty ratio $\alpha$ of the transistor Q1 will prevent a decrease in the on duty resulting from the decrease in the power supply voltage $V_{pig}$.

By providing feed-forward control over the duty ratio (on duty) $\alpha$ based on changes in the power supply voltage (input voltage) $V_{pig}$, changes in the actual booster voltage $V_{bpig}$ caused by changes in the power supply voltage (input voltage) $V_{pig}$ can be prevented. More specifically, changes in the actual booster voltage $V_{bpig}$ caused by sudden changes in the power supply voltage (input voltage) $V_{pig}$ can be prevented.

The booster control section 200 includes detecting means, target voltage setting means, duty ratio setting means, and controlling means.

FIG. 2 is a flowchart of a booster control program executed by the CPU of the booster control section 200. The operations in the flowchart is executed at predetermined control intervals.

At S10, various data, e.g., the target booster voltage $V_{bpig*}$, the actual booster voltage $V_{bpig}$, and the power supply voltage (input voltage) $V_{pig}$, is read. At S20, the deviation between the target booster voltage $V_{bpig*}$ and the actual booster voltage $V_{bpig}$ is calculated. At S30, proportion (P), integration (I), and differentiation (D) operations are performed on the deviation to calculate a control value for the transistor Q1. At S40, a duty ratio (on duty) $\alpha$ corresponding to the control value obtained at S30 is calculated. Steps S20 through S40 correspond to the feedback control section 220. Also, step S40 corresponds to duty ratio setting means.

At S50, a time differential of the power supply voltage (input voltage) $V_{pig}$ is obtained to calculate an input voltage change $\Delta V_{pig}$. Step S50 corresponds to the differentiator 240. At S60, a correction value based on the input voltage change $\Delta V_{pig}$ is calculated. More specifically, the ratio of the input voltage change $\Delta V_{pig}$ to the target booster voltage $V_{bpig*}$ is calculated as the correction value $\beta$ ($\beta = \Delta V_{pig}/V_{bpig*}$). At S70, the ratio of the input voltage change $\Delta V_{pig}$ to the target booster voltage $V_{bpig*}$ ($\beta = \Delta V_{pig}/V_{bpig*}$) is subtracted from the duty ratio (on duty) $\alpha$, calculated as S40, and the new duty ratio $\alpha$ is set to this new value. Step S70 corresponds to the adder 260. Then, at step S80, conversion to a new duty ratio drive signal (PWM drive signal) for the transistor Q1 is performed based on the new duty ratio (on duty) $\alpha$, and this converted duty ratio drive signal is applied to the transistor Q1 of the booster circuit 100. At step S80, a duty ratio $(1-|\alpha|)$ for the transistor Q2 is obtained based on the new duty ratio (on duty) $\alpha$, and this duty ratio is converted to a duty ratio drive signal (PWM drive signal). This converted duty ratio drive signal is applied to the transistor Q2 of the booster circuit 100. S80 corresponds to the PWM output section 230.

The first embodiment has the following characteristics:

(1) In the control method according to this embodiment, the power supply voltage (input voltage) $V_{pig}$ and the actual booster voltage $V_{bpig}$ are detected, the duty ratio $\alpha$ is set up to eliminate the deviation between the target booster voltage $V_{bpig*}$ and the actual booster voltage $V_{bpig}$ and a correction value $\beta$ corresponding to the input voltage change $\Delta V_{pig}$ obtained based on the power supply voltage $V_{pig}$ is calculated. More specifically, the correction value $\beta$ is calculated as the ratio between the input voltage change $\Delta V_{pig}$ and the target booster voltage $V_{bpig*}$ ($\beta = \Delta V_{pig}/V_{bpig*}$). The correction value β is subtracted from the duty ratio α, and the corrected value is set up as the new duty ratio α. Based on this new, corrected duty ratio, the transistor Q1 (switching element) is switched on and off. This provides feedback control.

The booster circuit 100 of the first embodiment is equipped with the booster control section 200 (detecting means) detecting the power supply voltage (input voltage) $V_{pig}$ and the actual booster voltage $V_{bpig}$. The booster control section 200 acts as target booster voltage setting means to set up the target booster voltage $V_{bpig*}$. Then, the booster control section 200 (duty ratio setting means) sets the duty ratio α so that the deviation between the target booster voltage $V_{bpig*}$ and the actual booster voltage $V_{bpig}$ is eliminated. Then, the booster control section 200 (controlling means) calculates the correction value β based on the input voltage change $\Delta V_{pig}$ obtained using the power supply voltage (input voltage) $V_{pig}$. More specifically, the booster control section 200 calculates the correction value β as the ratio between the input voltage change $\Delta V_{pig}$ and the target booster voltage $V_{bpig*}$ ($\beta = \Delta V_{pig}/V_{bpig*}$). Then, booster control section 200 (controlling means) corrects the duty ratio (on duty) α using the correction value β and, using the new corrected duty ratio (on duty) α, switches the transistor Q1 on and off to provide feedback control.

Be applying feed-forward control to the duty ratio (on duty) α based on changes in the power supply voltage (input voltage) $V_{pig}$, changes in the actual booster voltage $V_{bpig}$ based on changes in the power supply voltage $V_{pig}$ can be prevented, thus preventing changes in the actual booster voltage $V_{bpig}$ resulting from sudden changes in the power supply voltage $V_{pig}$. As a result, feedback control responsiveness can be improved for changes in the power supply voltage (input voltage).

Figure 4:
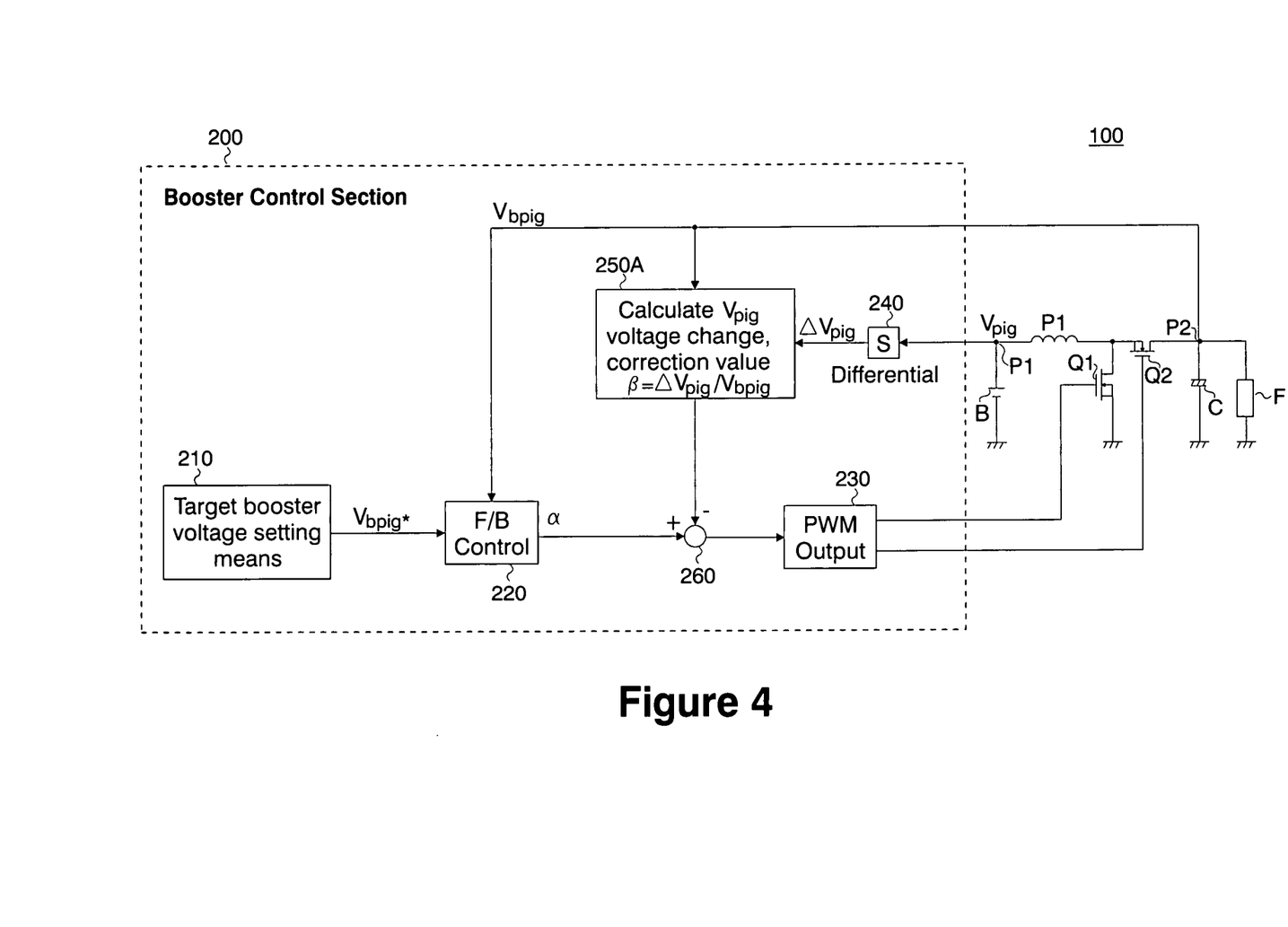
FIG. 4 is an electrical circuit diagram of a booster circuit according to a second embodiment.

A second embodiment will be described with reference to FIG. 4. Elements identical with those from the first embodiment will be assigned like numerals and the description will focus on the differences.

The second embodiment calculates the correction value β in a different manner from the first embodiment. More specifically, in the structure of the booster circuit 100, as shown in FIG. 4, there is a correction value calculation section 250A instead of the correction value calculation section 250. Other elements are the same as those from the first embodiment. In the correction value calculation section 250A, the correction value β is calculated as the ratio of the input voltage change $\Delta V_{pig}$ to the actual booster voltage $V_{bpig}$ ($\beta = \Delta V_{pig}/V_{bpig}$).

In the second embodiment, the booster control section 200 (the CPU not shown) executes a control program shown in the flowchart in FIG. 2 similar to that of the first embodiment. However, at step S60, the correction value β is calculated as the ratio of the input voltage change $\Delta V_{pig}$ to the actual booster voltage $V_{bpig}$ ($\beta = \Delta V_{pig}/V_{bpig}$). The other steps are the same as those from the first embodiment.

In the second embodiment, if the power supply voltage rises (increases), the input voltage change $\Delta V_{pig}$ obtained by applying time differentiation is $\Delta V_{pig} > 0$. If the power supply voltage $V_{pig}$ drops (decreases), $\Delta V_{pig} < 0$. Thus, the correction value β here also takes positive and negative values depending on whether the power supply voltage $V_{pig}$ increases or decreases.

The second embodiment has the following characteristics:

(1) In the control method according to the second embodiment, the power supply voltage (input voltage) $V_{pig}$ and the actual booster voltage $V_{bpig}$ are detected, the duty ratio α is set up to eliminate the deviation between the target booster voltage $V_{bpig*}$ and the actual booster voltage $V_{bpig}$, and a correction value β corresponding to the input voltage change $\Delta V_{pig}$ obtained based on the power supply voltage $V_{pig}$ is calculated. More specifically, the correction value β is calculated as the ratio between the input voltage change $\Delta V_{pig}$ and the actual booster voltage $V_{bpig}$ ($\beta = \Delta V_{pig}/V_{bpig}$). The correction value β is subtracted from the duty ratio α, and the corrected value is set up as the new duty ratio α. Based on this new, corrected duty ratio, the transistor Q1 (switching element) is switched on and off. This provides feedback control.

The booster circuit 100 of the second embodiment is equipped with the booster control section 200 (detecting means) detecting the power supply voltage (input voltage) $V_{pig}$ and the actual booster voltage $V_{bpig}$. The booster control section 200 acts as target booster voltage setting means to set up the target booster voltage $V_{bpig*}$. Then, the booster control section 200 (duty ratio setting means) sets the duty ratio α so that the deviation between the target booster voltage $V_{bpig*}$ and the actual booster voltage $V_{bpig}$ is eliminated.

Then, the booster control section 200 (controlling means) calculates the correction value β based on the input voltage change $\Delta V_{pig}$ obtained using the power supply voltage (input voltage) $V_{pig}$. More specifically, the booster control section 200 calculates the correction value β as the ratio between the input voltage change $\Delta V_{pig}$ and the actual booster voltage $V_{bpig}$ ($\beta = \Delta V_{pig}/V_{bpig}$). Then, booster control section 200 (controlling means) corrects the duty ratio (on duty) α using the correction value β and, using the new corrected duty ratio (on duty) α, switches the transistor Q1 on and off to provide feedback control.

As a result, the responsiveness of the feedback control applied to changes in the power supply voltage (input voltage) can be improved, and another embodiment is described below with reference to FIG. 4.

The embodiments of the present invention can be changed in the following manners.

(1) In the embodiments the correction value β is set as the ratio between the input voltage change and the target booster voltage or the input voltage change and the actual booster voltage. However, the present invention is not restricted to this. For example, a constant can be multiplied to the input voltage change $\Delta V_{pig}$ to determine the correction value.

(2) In the embodiments described above, the booster circuit 100 are equipped with the transistor Q2. However, it would also be possible to provide a booster circuit that replaces the transistor Q2 with a diode or Zener diode connected as described for the conventional technology.

(3) In the embodiments described above, the element 210 through the element 260, indicated as blocks in the booster control section 200, are functions carried out by a single CPU. However, it would be possible to have the functions distributed among multiple CPUs.

(4) A booster circuit as described above where the controlling means includes a correcting means to calculate a correction based on an input voltage change obtained based on the input voltage. In the embodiments above, the voltage booster control module 200 corresponds to a controlling means.

(5) A booster circuit as described above where the correcting means calculates the correction value as the ratio between the input voltage change calculated from the input voltage and the target booster voltage.

(6) A booster circuit as described above where the correcting means calculates the correction value as the ratio between the input voltage change determined from the input voltage and the actual booster voltage.

(7) In the embodiments described above, the operations for steps S50, S60 are performed after the steps S20 through S40, but it would also be possible for the operations for steps S50, S60 to be performed before step S20 through step S40.

With the invention described and as presented in detail above, changes in the actual booster voltage resulting from sudden changes in the power supply voltage (input voltage) can be prevented.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A booster circuit wherein energy is stored in an inductor when a switching element is on and said energy is superposed onto an input voltage to charge a capacitor disposed at an output side when said switching element is off, the booster circuit comprising:
    a detecting means detecting said input voltage and an actual booster voltage on said capacitor side;
    a target booster setting means setting a target booster voltage;
    a duty ratio setting means comprising an A/D converter, said duty ratio setting means performing proportion, integration and differentiation operations to calculate a control value for the switching element and setting a duty ratio corresponding to said control value so that deviation between said target booster voltage and said actual booster voltage is eliminated; and
    a controlling means calculating a correction value based on an input voltage change obtained from said input voltage, correcting said duty ratio with said correction value, and performing feedback control based on said corrected duty ratio by turning said switching element on and off.

2. A booster circuit as described in claim 1 wherein said correction value is a ratio between an input voltage change calculated from said input voltage and said target booster voltage.

3. A booster circuit as described in claim 1 wherein said correction value is a ratio between an input voltage change calculated from said input voltage and said actual booster voltage.

4. A method for controlling a booster circuit wherein energy is stored in an inductor when a switching element is on and said energy is superposed onto an input voltage to charge a capacitor disposed at an output side when said switching element is off, the method for controlling the booster circuit comprising the steps of:
    detecting said input voltage and an actual booster voltage on said capacitor side;
    setting a target booster voltage;
    performing proportion, integration and differentiation operations to calculate a control value for the switching element;
    setting a duty ratio corresponding to said control value to eliminate a deviation between said target booster voltage and said actual booster voltage;
    calculating a correction value based on an input voltage change obtained from said input voltage; and
    performing feedback control by turning on and off said switching element based on a new duty ratio formed by correcting said duty ratio with said correction value.

5. A method for controlling a booster circuit as described in claim 4 wherein said correction value is a ratio between said input voltage change calculated based on said input voltage and said target booster voltage.

6. A method for controlling a booster circuit as described in claim 4 wherein said correction value is a ratio between said input voltage change calculated based on said input voltage and said actual booster voltage.

7. A booster circuit as described in claim 2 wherein said controlling means comprises a correcting means for calculating said correction value.

8. A booster circuit as described in claim 7 wherein said correcting means is a booster control module.

9. A method for controlling a booster circuit as described in claim 5 wherein the step of calculating said correction value is performed by a controlling means, said controlling means comprising a correcting means.

10. A method for controlling a booster circuit as described in claim 9 wherein said correcting means is a booster control module.

11. A booster circuit as described in claim 3 wherein said controlling means comprises a correcting means for calculating said correction value.

12. A booster circuit as described in claim 11 wherein said correcting means is a booster control module.

13. A method for controlling a booster circuit as described in claim 6 wherein the step of calculating said correction value is performed by a controlling means, said controlling means comprising a correcting means.

14. A method for controlling a booster circuit as described in claim 13 wherein said correcting means is a booster control module.

* * * * *